United States Patent [19]

Ohno et al.

[11] Patent Number: 4,467,361
[45] Date of Patent: Aug. 21, 1984

[54] IMAGE PICK-UP APPARATUS

[75] Inventors: Kunio Ohno, Tokyo; Kimihiko Nishioka, Hachioji; Nobuo Yamashita, Hachioji; Susumu Takahashi, Hachioji; Akihiro Namba, Hachioji; Takashi Mizusaki, Sendai; Toshimasa Akagi; Masaru Iino, both of Hachioji, all of Japan

[73] Assignee: Olympus Optical Co., Ltd., Tokyo, Japan

[21] Appl. No.: 406,486

[22] Filed: Aug. 9, 1982

[30] Foreign Application Priority Data

Aug. 14, 1981 [JP]   Japan ............................... 56/126562

[51] Int. Cl.³ .............................................. H04N 1/12
[52] U.S. Cl. ..................................... 358/213; 358/212; 358/227
[58] Field of Search ............... 358/212, 213, 214, 225, 358/227; 354/402, 404, 477

[56]   References Cited

U.S. PATENT DOCUMENTS

4,245,240  1/1981  Tanaka .................................. 358/43
4,375,652  3/1983  White ................................... 358/213
4,404,594  9/1983  Hannan ................................. 358/209

Primary Examiner—G. Z. Rubinson
Assistant Examiner—Robert Lev
Attorney, Agent, or Firm—Parkhurst & Oliff

[57]   ABSTRACT

An apparatus for picking-up an image of an object including a solid state image sensor having a number of image sensing elements and an objective lens for projecting the image of the object onto the image sensor is disclosed. In order to remove a curvature of field of the objective lens, the image sensor is curved into a spherical shape having a radius of curvature equal to that of the curvature of field. The solid state image sensor may be curved in any desired shape to correct various aberrations of the objective lens.

15 Claims, 13 Drawing Figures

FIG_7

FIG_8

FIG_9

IMAGE PICK-UP APPARATUS

BACKGROUND OF THE INVENTION

This invention relates to an apparatus for picking-up an image of an object comprising a solid state image sensor having a number of image sensing elements and an optical system for forming an image of an object to be picked-up on the image sensor.

Such an image pick-up apparatus has been used in an endoscope, a television camera, etc. In the known image pick-up apparatus, the solid state image sensor has a flat shape and is arranged at a predetermined focal plane of the optical system. Such an image pick-up apparatus has a property that the apparatus can be constructed compact and small. For this purpose, the optical system, e.g. an objective lens is liable to have a wide angle of view. In general, when the angle of view becomes wider, aberrations, particularly curvature of field and distortion are increased. In order to correct such aberrations, it has been proposed to form the objective lens from a larger number of lens elements. This results in that the objective lens becomes large, heavy and expensive, which limits the merit of the image pick-up apparatus of this kind. Particularly, in case of installing the image pick-up apparatus in a distal end of an endoscope, it is impossible to arrange a large objective lens, so that the aberrations could not be corrected fully.

Further, in case of the endoscope, the object to be inspected has a large depth and object distances of various points on the object greatly differ from one another. Therefore, the best focal plane is curved to a great extent and thus, it is impossible to obtain the image of good quality up to its periphery.

SUMMARY OF THE INVENTION

The present invention has for its object to provide a novel and useful apparatus for picking-up an image of an object, which can fully correct the aberrations of an optical system without increasing the number of lens elements.

According to the invention, in an apparatus for picking-up an image of an object comprising a solid state image sensor having a number of image sensing elements, and an optical system for forming an image of an object to be picked-up on the image sensor, said image sensor is so curved that respective image sensing elements are situated on a curved surface on which the image of the object is formed.

In a preferred embodiment of the image pick-up apparatus according to the invention, the image sensor is curved into a shape corresponding to a curvature of field of the optical system.

In further preferred embodiment of the image pick-up apparatus according to the invention, areas of the image sensing elements of the image sensor are changed so as to correct a distortion of the optical system.

According to the invention, the solid state image sensor may be constructed by photodiode array, CCD image sensor, BBD image sensor, MOS image sensor and SIT image sensor. Among these image sensors, the SIT (Static Induction Transistor) image sensor is most suitable, because it possesses various superior characteristics such as high imput impedance, non-saturated current-voltage characteristic, large amplification, low distortion and low noise.

DESCRIPTION OF THE PREFERRED EMBODIMENTS

Figure 1A:
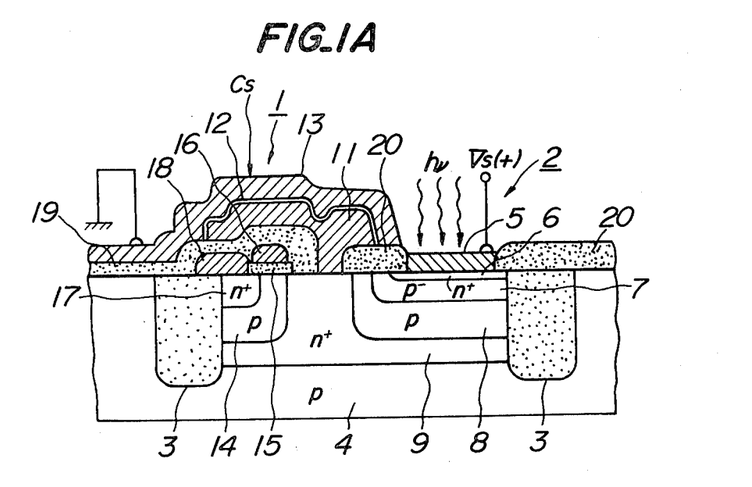
FIGS. 1A and 1B are a cross sectional view and an equivalent circuit showing an embodiment of an image sensing element of an SIT image sensor.
Figure 1B:
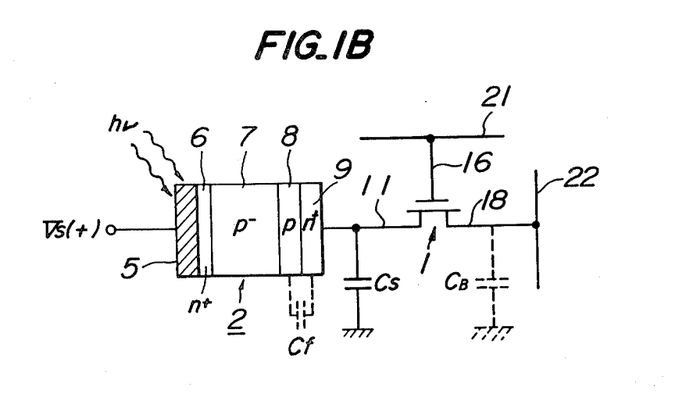

FIGS. 1A and 1B show an embodiment of an image sensing element or unit cell of an SIT image sensor for use in the image pick-up apparatus according to the invention. The sensing cell mainly comprises MOS type SIT 1 for use in reading out information and a photo transistor 2. The image sensing cell of this embodiment is a surface irradiation type with an amplification function and includes an n+-p junction formed by floating regions. The MOS type SIT 1 and photo transistor 2 are formed in a p type semiconductor substrate 4 which is surrounded by an insulating isolation region 3. The photo transistor 2 has a floating emitter construction comprising a surface transparent electrode 5, an n+ type surface layer 6, a p− type layer 7, a p type floating region 8 and an n+ type floating region 9. The n+ floating region 9 constitutes an emitter of the photo transistor 2 and is connected to a drain electrode 11 of the reading-out MOS type SIT 1. On the drain electrode 11 is applied a conductive layer 13 via an insulating layer 12. These drain electrode 11, insulating layer 12 and conductive layer 13 form a storage capacitance $C_S$. A gate region (p type channel) 14 of the SIT 1 is formed adjacently to the n+ floating region 9, and on the gate region 14 are provided a gate oxide film 15 and a gate electrode 16 successively. An n+ type source region 17 is formed adjacently to the p channel gate region 14 and a source electrode 18 is connected to the source region 17. The drain region 11, conductive layer 13, gate electrode 16 and source electrode 18 are mutually isolated by means of an insulating layer 19, and the drain electrode 11 of SIT 1, conductive layer 13 and photo transistor 2 are mutually isolated from each other by means of an insulating layer 20.

In the SIT image sensing element described above, to the transparent surface electrode 5 of the photo transistor 2 is applied a positive bias voltage $V_s(+)$ which is sufficiently large to induce a depletion region in the p− region 7. Further, to the gate electrode 16 of the MOS type SIT 1 is connected a word line 21 which conducts a signal for reading out a voltage stored in the capacitance $C_s$, and to the source electrode 18 is connected a bit line 22 for deriving the readout voltage.

Now, the operation of the SIT image sensing element will be explained with reference to FIGS. 2A to 2E.

Figure 2A:
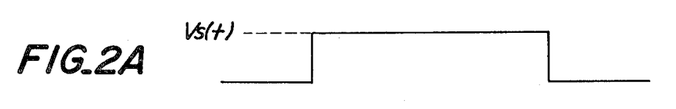
FIGS. 2A to 2E are signal waveforms for explaining an operation of the SIT image sensor.

When light hv is made incident upon the transparent surface electrode 5, while the sufficiently large bias voltage $V_s(+)$ is applied thereto as illustrated in FIG. 2A, electron-hole pairs are excited. Electrons of these pairs are immediately absorbed in the n+ surface layer 6, and holes are accelerated by a strong electric field applied across the p− region 7 and are flown into the p type floating region 8. Then the p floating region 8 is electrified in positive as shown by a curve $V_p(t)$ in FIG. 2B. When the p floating region 8 is positively electrified, a p-n junction between the p floating region 8 and n+ floating region 9 is biased forwardly. Then, electrons are injected from the n+ floating region 9 into the p floating region 8, and the injected electrons are passed through the p floating region 8, drifted through the highly resistive p− region 7 and are absorbed in the n+ surface layer 6. In this manner, the electrons are flown out of the n+ floating region 9, and the electrons are lacking in this region 9. This results in that the n+ floating region 9 is charged in positive as illustrated by a curve $V_n(t)$ in FIG. 2C. The charged potential $V_n(t)$ of the n+ floating region 9 can be expressed as follows as long as the p floating region 8 can be considered to be sufficiently thin.

$$V_n(t) \simeq \frac{q \cdot s \cdot c}{C_f} \cdot t \qquad (1)$$

wherein $C_f$ is a capacitance of the p floating region 8, q is a unit charge amount, s is a photon density and c is the velocity of light. As can be seen from the above equation (1), the potential $V_n(t)$ is in proportion to the incident light amount and an exposure time t, but is inversely proportional to the capacitance $C_f$. Therefore, if the capacitance $C_f$ of the p floating region 8 is made small, a large voltage change can be obtained due to an injection of a small amount of holes, and a sensitivity becomes very high. It should be noted that the storage capacitance $C_s$ connected to the n+ floating region 9 does not substantially affect the voltage value at the n+ floating region 9, because the elections are flown from the n+ floating region 9 until the floating n30-p junction is biased forwardly irrespective of $C_s$ due to amplification of a hook configuration.

Contrary to this, in the known MOS type image sensor, the potential at the storage region is given by the following equation (2).

$$\frac{q \cdot s \cdot c}{C_s} \cdot t \qquad (2)$$

Then the SIT image sensor has a sensitivity higher than the MOS image sensor by a factor of $C_s/C_f$. Since the capacitance $C_f$ can be easily made small, $C_s/C_f$ may be easily increased up to 10 to 100.

Figure 2B:
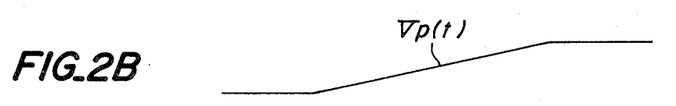
Figure 2C:
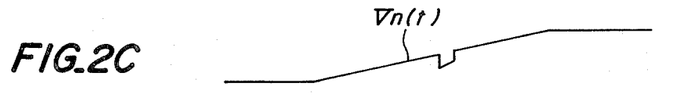
Figure 2D:
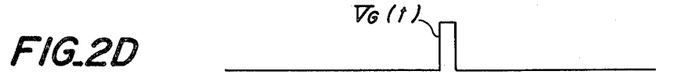
Figure 2E:
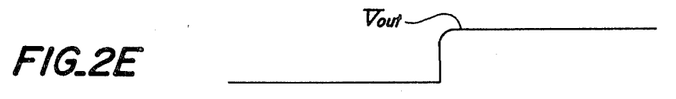

In the SIT image sensor, the reading-out may be effected both in a destructive manner and a non-destructive manner. In case of the non-destructive reading-out, the MOS type SIT 1 is made conductive by applying to its gate a pulse shown by $V_G(t)$ in FIG. 2D via the word line 21. When the SIT 1 is made conductive, the positive potential $V_n(t)$ of the n+ floating region 9 is once decreased as illustrated in FIG. 2C, because the electrons are flown from the source region 17 into the n+ floating region 9 by means of the p channel gate region 14. Then the potential $V_p(t)$ at the p floating region 8 is increased as shown in FIG. 2B and thus, the floating $n^{30}$-p junction is deeply biased forwardly. Therefore, the electrons flown into the region 9 are immediately injected into the p− region 7 of high resistance. In this manner, it is possible to derive a readout voltage $V_{out}$ as shown in FIG. 2E irrespective of a stray capacitance $C_B$ of the bit line 22. In this case, the potential $V_n(t)$ at the n+ floating region 9 is once decreased, but is increased again and thus, the non-destructive reading-out can be effected.

As explained above, the SIT image sensor has the following superior properties.

(1) Since the SIT has the non-saturated current-voltage characteristic having good linearity, the readout voltage may be changed linearly over a very wide range with respect to the voltage stored in the storage capacitance $C_s$ in an analog manner. Therefore, a very wide dynamic range can be obtained.

(2) Since the SIT image sensor has a high density of integration, a surface area of respective elements can be made very small, so that a resolution can be increased very much.

(3) The reading-out can be effected both in the destructive manner and in the non-destructive manner.

(4) Since the very large amplification can be attained, the light detection can be carried out with a high sensitivity and a large signal can be derived even if an incident light amount is small.

(5) Since respective sensing elements can be driven independently from each other, a so-called random access can be effected. Further, the sensitivity of respective sensing elements can be adjusted independently from each other.

(6) Since the mobility of electrons in the channel is large, writing-in/reading-out can be effected at a high speed.

(7) SITs connected to the storage capacitance $C_s$ for effecting refresh can be formed in the common semiconductor substrate and it is possible to refresh the storage capacitance $C_s$ easily by selectively driving the refreshing SIT.

The above explained SIT image sensor can be advantageously used in the pick-up apparatus according to the invention.

Figure 3:
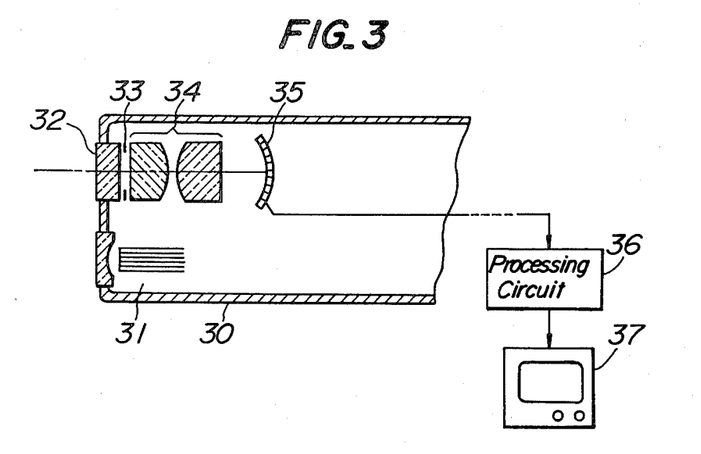
FIG. 3 is schematic view illustrating an embodiment of the image pick-up apparatus according to the invention.

FIG. 3 is a schematic view showing an embodiment of the image pick-up apparatus according to the invention, which is provided in a distal end of a sheath 30 of an endoscope. The endoscope comprises an illuminating optical system 31 for illuminating an object to be inspected. Light reflected by the object is introduced into the sheath 30 via a transparent glass window 32 and an image of the object is formed on an SIT image sensor 35 by means of a stop 33 and an imaging optical system 34. In the present embodiment, the imaging optical system 34 is formed by an objective lens consisting of a plurality of convex lenses. An image signal derived from the SIT image sensor 35 is supplied via a signal processing circuit 36 to a monitor 37, on which the image of the object is displayed.

When the objective lens 34 is formed by n convex lens elements, a Petzval sum may be expressed by the following equation (3).

$$\sum_{i=1}^{n} \frac{1}{f_i n_i} \qquad (3)$$

wherein $f_i$ and $n_i$ are focal length and refractive index, respectively of $i^{th}$ lens element. This Petzval sum is always positive and thus, a very large curvature of field is produced. Therefore, heretofore it is very difficult to increase an angle of view more than 90°. In the endoscope, it is always desired to make the angle of view as wide as posssible.

The objective lens 34 composed of n lens elements has a radius R of the curvature of field which may be expressed by the following equation (4).

$$R = \frac{1}{\sum_{j=1}^{n} \frac{1}{f_j n_j}} \qquad (4)$$

wherein $f_j$ and $n_j$ are focal length and refractive index, respectively of $j^{th}$ lens.

In the present embodiment, the SIT image sensor 35 is not made flat, but is curved into a spherical surface corresponding to the curvature of field. That is to say, this spherical surface has a radius which is substantially equal to the radius R defined by the above equation (4) with taking into account such as coma. By such a construction, the curvature of field, coma, etc. can be effectively removed and a sharp image can be obtained up to a periphery. In this manner, the small size image pick-up apparatus having a wide angle of view more than 90° can be constructed simply.

Figure 4:
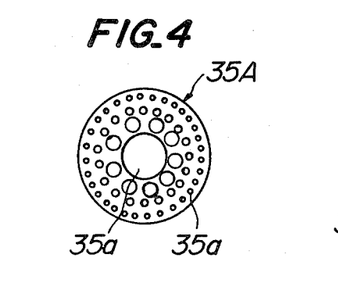
FIG. 4 and FIG. 5 are plan views showing two embodiments of the SIT image sensor according to the invention.
Figure 5:
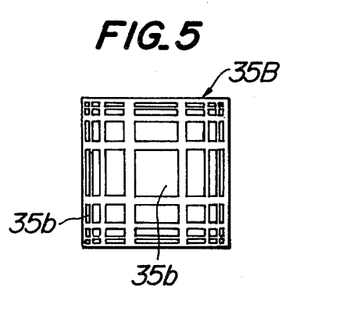

When the imaging optical system 34 is formed by the objective lens having the wide angle of view as illustrated in FIG. 3, in general there is produced a negative distortion and the image in the periphery of the field of view becomes smaller than that in the central portion, which results in decrease of the resolution. In order to remove such a distortion, the curved SIT image sensor may be formed in such a manner that surface areas of the image sensing elements are made gradually smaller from the center to the periphery. FIGS. 4 and 5 are plan views showing two embodiments of such an SIT image sensor according to the invention. In FIG. 4, the SIT image sensor 35A comprises circular image sensing elements 35a whose surface areas are gradually decreased toward the periphery of the image sensor 35A. In FIG. 5, the SIT image sensor 35B has a number of rectangular image sensing elements 35b which have the maximum surface area at the center and have the minimum surface area at the periphery. Although FIGS. 4 and 5 do not depict the curvature of the SIT image sensors 35A and 35B, they are curved into the spherical surface corresponding to the curvature of field as explained above.

Figure 6:
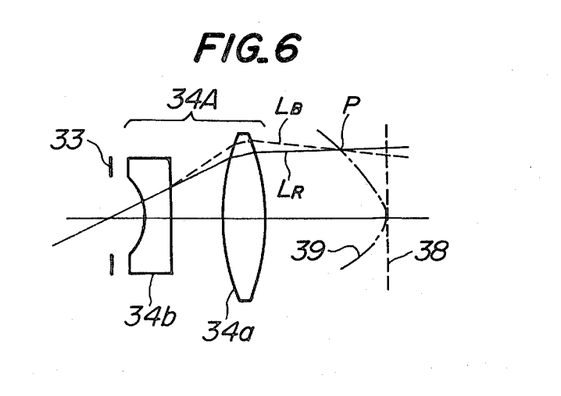
FIG. 6 is a schematic view depicting another embodiment of the image pick-up apparatus according to the invention.

FIG. 6 is a schematic view showing another embodiment of the image pick-up apparatus according to the invention. In this embodiment, the objective lens 34A is consisting of a convex lens 34a and a concave lens 34b. In this case, a principal light ray passing through a stop 33 is subjected to different refraction depending upon color. For instance, a red principal light ray $L_R$ and a blue principal light ray $L_B$ intersect with each other at a point P which situates in front of a Gaussian plane 38 and thus, a chromatic aberration of magnification occurs. In such a case, the SIT image sensor is curved along a curved surface 39 including the intersecting points P and then, the chromatic aberration of magnification can be removed effectively.

Figure 7:
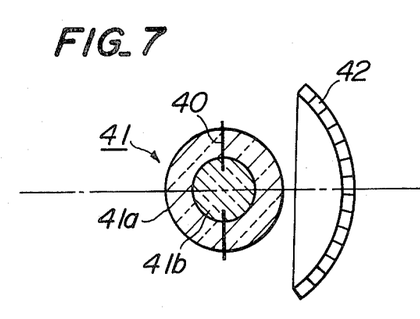
FIGS. 7, 8 and 9 are cross sectional views illustrating three embodiments of the image pick-up apparatus according to the invention in which a sphere lens is used.

FIG. 7 is a cross section showing another embodiment of the image pick-up apparatus according to the invention. The pick-up apparatus of this embodiment comprises an imaging optical system consisting of a stop 40 and a sphere lens 41, and an SIT image sensor 42 curved into a spherical surface which is concentrical with the sphere lens 41. The sphere lens 41 is consisting of two concentric lens elements 41a and 41b having refractive indices $n_a$ and $n_b$, and Abbe numbers $v_a$ and $v_b$, respectively which satisfy the following conditions.

$$n_a > n_b, \quad v_a < v_b \qquad (5)$$

In this embodiment, since use is made of the sphere lens 41 as the imaging optical system, the coma aberration can be inherently removed. Further, since the SIT image sensor 42 is curved into the spherical surface concentrically with the sphere lens 41, the curvature of field can be fully removed. Moreover, since the sphere lens 41 is formed by the lens elements 41a and 41b which satisfy the above conditions (5), the spherical and chromatic aberrations can be effectively corrected.

Figure 8:
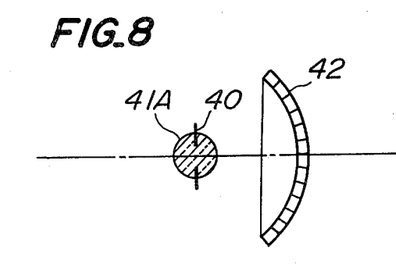

FIG. 8 illustrates a modified embodiment of the image pick-up apparatus shown in FIG. 7. In the embodiment of FIG. 7, the sphere lens 41 is formed by the two concentric lenses 41a and 41b, but in the present embodiment, a sphere lens 41A is consisting of a single nonhomogeneous sphere lens in which the refractive index is made gradually smaller toward the center of lens and the Abbe number is made gradually smaller toward the periphery of lens. It should be noted that the SIT image sensor 42 is curved along a spherical surface which is concentrical with the sphere lens 41A.

As described above, in the embodiments shown in FIGS. 7 and 8, the image pick-up apparatus is formed by a combination of the sphere lens 41 and the spherical SIT image sensor 42. Therefore, the pick-up apparatus can be constructed very simply and can be easily applied to various kinds of instruments.

Figure 9:
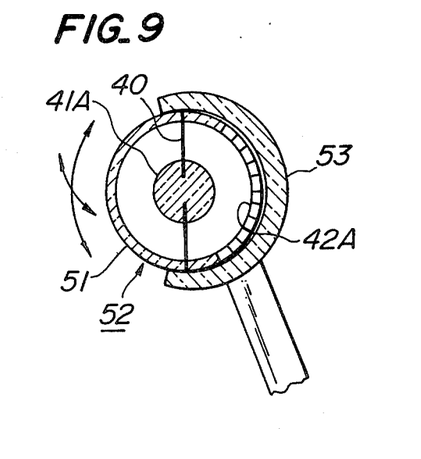

FIG. 9 is a cross section showing still another embodiment of the image pick-up apparatus according to the invention using the sphere lens. In this embodiment, a spherical SIT image sensor 42A is united to a spherical member 51 made of transparent material such as glass and plastics to form a complete sphere body 52. Inside of this sphere body 52 is arranged an imaging optical system comprising a stop 40 and a sphere lens 41A which is similar to the inhomogeneous sphere lens 41A shown in FIG. 8. As illustrated in FIG. 9, the sphere lens 41A is supported by means of the stop 40 coupled with the sphere body 52. The sphere body 52 is rotatably supported by a holder 53 made of transparent material. Then by rotating the sphere body 52 in the holder 53 in all directions, it is possible to pick-up the images of the objects all around the apparatus. It is matter of course that the aberrations can be fully removed in the pick-up apparatus shown in FIG. 9.

Figure 10:
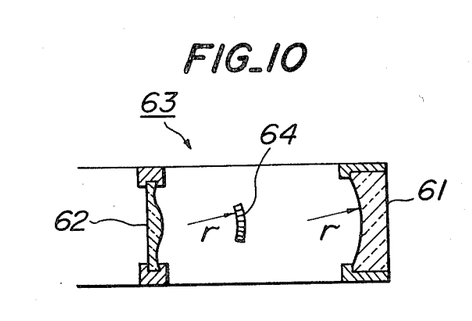
FIG. 10 is a cross sectional view showing another embodiment of the image pick-up apparatus according to the invention which is installed in a Schmidt optical system.

FIG. 10 illustrates still another embodiment of the image pick-up apparatus according to the invention which is installed in a Schmidt optical system. In the present embodiment, the Schmidt optical system 63 comprises a main mirror 61 having a radius of curvature r and a correction plate 62. A curved SIT image sensor 64 is arranged along a focal plane having a radius of curvature r which is equal to the radius of curvature r of the main mirror 61. That is to say, the SIT image sensor 64 is curved in a convex manner toward the main mirror 61. By such a construction, the aberrations can be effectively removed and the image of object can be obtained without changing films or photographic plates. Further, since use is made of the SIT image sensor 64 having the very high sensitivity, even if incident light is weak, it is possible to pick-up the image clearly. Therefore, this pick-up apparatus is particularly suitable for an astronomical inspection.

Figure 11:
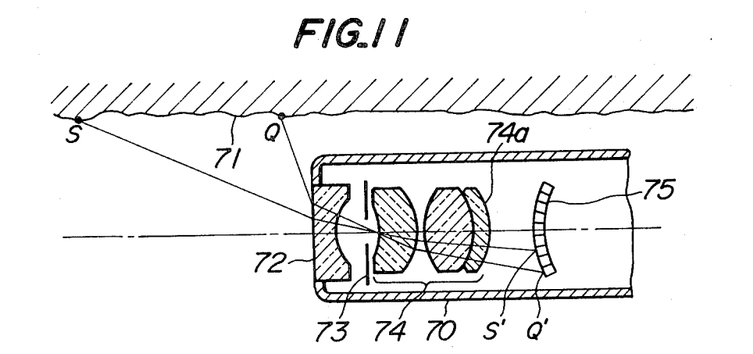
FIG. 11 is a cross sectional view showing an embodiment of the image pick-up apparatus according to the invention which is installed in an endoscope of a direct view type.

FIG. 11 is a cross section illustrating another embodiment of the image pick-up apparatus according to the invention which is applied to an endoscope of a direct view type. In this embodiment, an image of an object 71 is formed, by means of a transparent glass window 72 provided at a distal end surface of a flexible sheath 70, a stop 73 and an imaging optical system 74 composed of three lens elements, onto a curved SIT image sensor 75. In general, the endoscope is used to inspect inner walls of tubular bodies such as pipes and various tubular organs of human beings. In such a case, the image of the object 71 having a large depth must be formed. A point Q of the object 71 which situates at the periphery of field of view has a shorter object distance as compared with a point S situating near the center of field of view and thus, the image of point Q is formed at a point Q' which is remote from a last lens surface 74a and the image of point S is formed at a point S' which is near the last lens surface 74a. Therefore, in the present embodiment, the SIT image sensor 75 is curved in a convex manner toward the optical system 74 so as to be situated on a curved surface on which the focused image of the object 71 is formed. In this construction, the sharply focused image over the whole field of view is formed on the SIT image sensor 75 and thus, it is always possible to display on the monitor the image having an excellent image quality.

Figure 12:
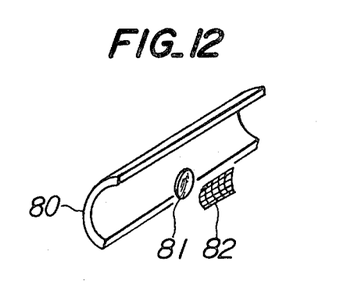
FIG. 12 is a partially cutaway perspective view illustrating another embodiment of the image pick-up apparatus according to the invention which is installed in an endoscope of side view type.

FIG. 12 is a perspective view illustrating a main portion of the endoscope of side view type comprising the image pick-up apparatus according to the invention. In this embodiment, an image of an object is formed by means of a transparent semi-cylindrical member 80 and an objective lens 81 on a curved SIT image sensor 82. In case of the endoscope of side view type, an image plane of the objective lens 81 becomes cylindrical due to difference in object distance. Therefore, the SIT image sensor 82 is curved into a corresponding cylindrical shape. As illustrated in FIG. 12, the cylindrically curved SIT image sensor 82 may be concentric with respect to the sheath of the endoscope and therefore, the image sensor of large size may be easily installed in the sheath. That is to say, in the present embodiment, not only the aberrations and difference in object distance can be effectively removed, but also the endoscope can be made much smaller.

Figure 13:
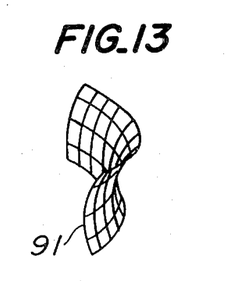
FIG. 13 is a perspective view of another embodiment of the image sensor for use in the endoscope shown in FIG. 12.

FIG. 13 is a perspective view of an embodiment of the curved SIT image sensor 91 which may be advantageously installed in the endoscope of side view type. In the present embodiment, the SIT image sensor 91 is curved into a toroidal shape.

As explained above in detail, according to the invention, the solid state image sensor is so curved that the aberrations of the imaging optical system and/or the difference in object distance can be corrected and thus, the image of high quality can be obtained. Although it is preferable to utilize the SIT image sensor, any other solid state image sensors such as photo diode array, CCD image sensor, BBD image sensor and MOS image sensor may be equally used.

According to the invention, the aberrations due to the imaging optical system can be effectively removed by shaping the solid state image sensor in accordance with the best focal plane of the optical system. Further, the difference in object distance can be also compensated for by curving the image sensor correspondingly. Since it is not necessary to increase the number of lens elements in order to correct the aberrations, the optical system can be made compact, small and light. Further, the image sensor may be curved into a shape matching to a main body for incorporating the image sensor, the whole construction may be made much smaller.

What is claimed is:

1. In an apparatus for picking-up an image of an object comprising a solid state image sensor having a number of image sensing elements, and an optical system for forming an image of an object to be picked-up on the image sensor, the improvement in that said image sensor is so curved that respective image sensing elements are situated on a curved surface on which the image of the object is formed.

2. An apparatus according to claim 1, wherein said solid state image sensor is so curved that aberrations of the imaging optical system can be corrected.

3. An apparatus according to claim 2, wherein said solid state image sensor is curved corresponding to a curvature of field of the imaging optical system.

4. An apparatus according to claim 2, wherein said solid state image sensor is curved corresponding to a chromatic aberration of magnification of the imaging optical system.

5. An apparatus according to claim 1, wherein said imaging optical system is formed by a sphere lens and said solid state image sensor is curved into a spherical surface which is concentrical with the sphere lens.

6. An apparatus according to claim 5, wherein said sphere lens is formed by two concentric sphere lens elements, and refractive index and Abbe number of the outer sphere lens element are made smaller and larger than those of the inner sphere lens element.

7. An apparatus according to claim 5, wherein said sphere lens is formed by a single inhomogeneous sphere lens having a refractive index which is gradually decreased toward the center and an Abbe number which is gradually decreased toward the periphery.

8. An apparatus according to claim 5, wherein said spherical solid state image sensor is united to a spherical member made of transparent material to form a sphere body which is rotatably supported by a holder made of transparent material, and said sphere lens is arranged inside the sphere body concentrically therewith.

9. An apparatus according to claim 1, wherein said imaging optical system comprises a Schmidt optical system having a main concave mirror and a correction plate, and said solid state image sensor is curved in a convex manner toward the main concave mirror into a spherical surface having a radius of curvature which is equal to a radius of curvature of the main concave mirror.

10. An apparatus according to claim 1, wherein said solid state image sensor is curved in such a manner that the image sensing elements are situated on a curved surface on which images of points having different object distances are formed.

11. An apparatus according to claim 10, wherein the solid state image sensor is curved in a convex manner toward the imaging optical system.

12. An apparatus according to claim 10, wherein the solid state image sensor is curved into a cylindrical shape.

13. An apparatus according to claim 10, wherein the solid state image sensor is curved into a toroidal shape.

14. An apparatus according to any one of claims 1 to 13, wherein said curved solid state image sensor is formed by a static induction transistor image sensor.

15. An apparatus according to any one of claims 1 to 13, wherein surface areas of the image sensing elements of the curved solid state image sensor are gradually decreased toward the periphery thereof so as to correct a distortion of the imaging optical system.

* * * * *